(12) United States Patent
Lee

(10) Patent No.: US 12,183,041 B2
(45) Date of Patent: Dec. 31, 2024

(54) VEHICLE AND CONTROL METHOD THEREOF

(71) Applicants: Hyundai Motor Company, Seoul (KR); Kia Corporation, Seoul (KR)

(72) Inventor: Jung Hyun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 11 days.

(21) Appl. No.: 18/337,376

(22) Filed: Jun. 19, 2023

(65) Prior Publication Data

US 2024/0070916 A1    Feb. 29, 2024

(30) Foreign Application Priority Data

Aug. 29, 2022  (KR) .................. 10-2022-0108698

(51) Int. Cl.
| | |
|---|---|
| G06T 7/80 | (2017.01) |
| H04N 17/00 | (2006.01) |
| H04N 23/90 | (2023.01) |
| H04N 23/54 | (2023.01) |

(52) U.S. Cl.
CPC ............ G06T 7/80 (2017.01); H04N 17/002 (2013.01); H04N 23/90 (2023.01); *G06T 2207/30204* (2013.01); *G06T 2207/30244* (2013.01); *G06T 2207/30252* (2013.01); *H04N 23/54* (2023.01)

(58) Field of Classification Search
CPC ............ G06T 7/80; G06T 2207/30204; G06T 2207/30244; G06T 2207/30252; H04N 17/002; H04N 23/90; H04N 23/54
See application file for complete search history.

(56) References Cited

U.S. PATENT DOCUMENTS

| | | | | |
|---|---|---|---|---|
| 10,916,035 | B1* | 2/2021 | Kroeger | G05D 1/0212 |
| 11,151,745 | B2* | 10/2021 | Kim | B60W 50/14 |
| 11,270,462 | B2* | 3/2022 | Hagenburg | H04N 23/90 |
| 11,881,001 | B2* | 1/2024 | Myokan | H04N 25/61 |
| 2009/0299684 | A1* | 12/2009 | Imanishi | H04N 17/002 |
| | | | | 702/150 |
| 2010/0245576 | A1* | 9/2010 | Inui | G06T 7/80 |
| | | | | 348/148 |
| 2014/0085469 | A1* | 3/2014 | Sakano | G06T 7/80 |
| | | | | 348/148 |
| 2015/0178922 | A1* | 6/2015 | Nakai | G06T 7/80 |
| | | | | 348/187 |
| 2015/0341629 | A1 | 11/2015 | Zeng et al. | |

(Continued)

*Primary Examiner* — Brian P Yenke
(74) *Attorney, Agent, or Firm* — Slater Matsil, LLP

(57) ABSTRACT

An embodiment vehicle includes a multi-camera including a first, second, and third cameras and a controller configured to receive a first image captured by the first camera in a first direction, a second image captured by the second camera in a second direction perpendicular to the first direction, and a third image captured by the third camera in a third direction perpendicular to the first and second directions, to detect calibration markers from each of the first, second, and third images, to calibrate a first movement value in an optical axis direction of each of the first, second, and third cameras, to calibrate a second movement value in the second direction of the first camera, to calibrate a third movement value in the third direction of the first camera, and to calibrate a capture area of the first camera.

20 Claims, 16 Drawing Sheets

(56) References Cited

U.S. PATENT DOCUMENTS

| | | | |
|---|---|---|---|
| 2016/0176343 A1* | 6/2016 | Sakano | G06V 20/56 |
| | | | 348/148 |
| 2017/0136948 A1* | 5/2017 | Sypitkowski | H04N 5/265 |
| 2018/0232893 A1* | 8/2018 | Tanaka | H04N 23/90 |
| 2018/0365859 A1* | 12/2018 | Oba | B60W 40/114 |
| 2019/0206084 A1* | 7/2019 | Noble | G06V 20/597 |
| 2019/0213756 A1* | 7/2019 | Chang | G06V 20/56 |
| 2020/0211224 A1* | 7/2020 | Kawabe | H04N 17/002 |
| 2022/0051434 A1* | 2/2022 | Suzuki | H04N 23/90 |
| 2023/0109473 A1* | 4/2023 | Han | H04N 23/90 |
| | | | 348/135 |
| 2023/0215026 A1* | 7/2023 | Du | B60W 10/04 |
| | | | 701/25 |
| 2023/0410366 A1* | 12/2023 | Liang | G01S 7/4086 |
| 2024/0020875 A1* | 1/2024 | den Hartog | G06F 18/24133 |
| 2024/0107001 A1* | 3/2024 | Bai | H04N 23/90 |
| 2024/0169587 A1* | 5/2024 | Han | G06T 7/80 |

* cited by examiner

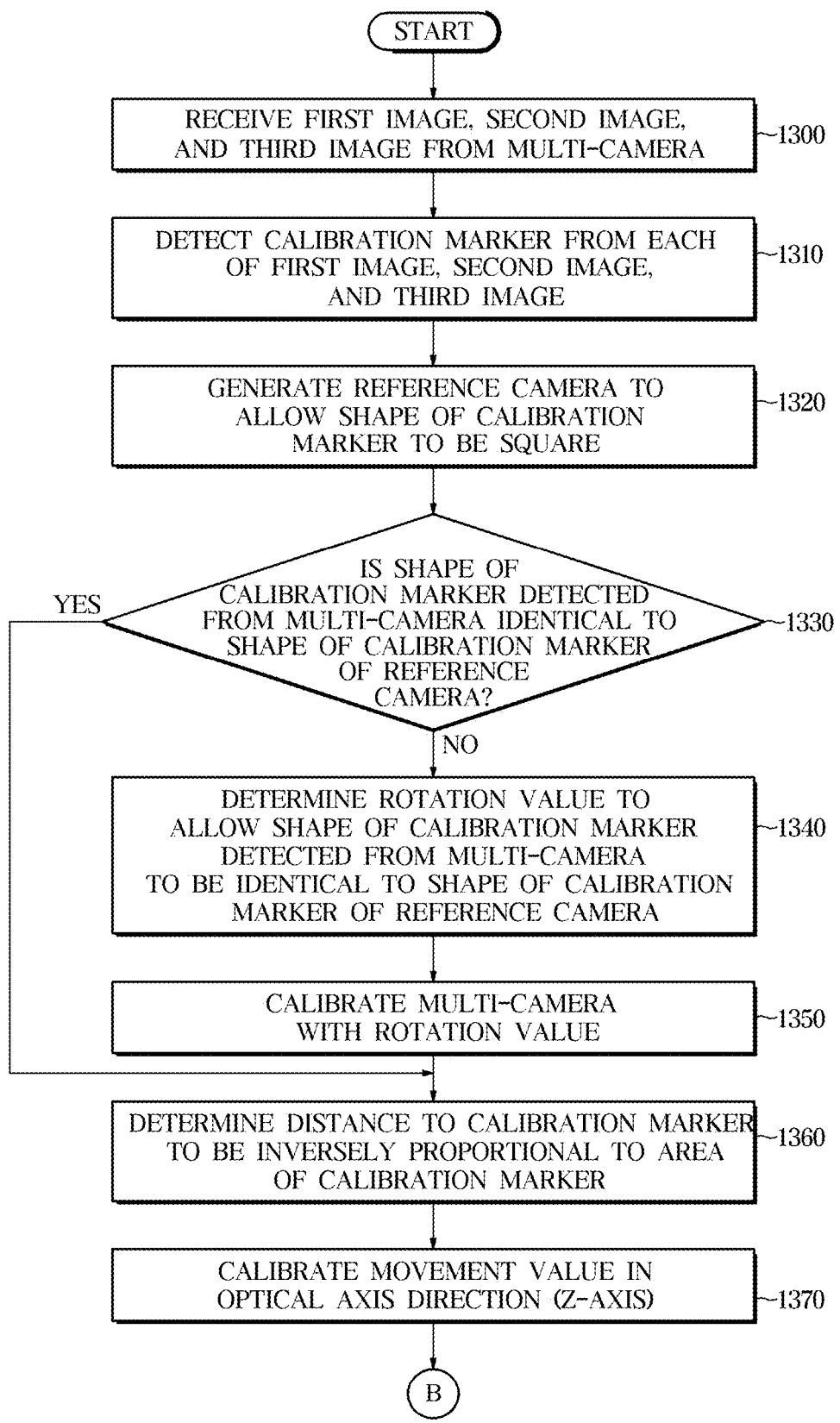

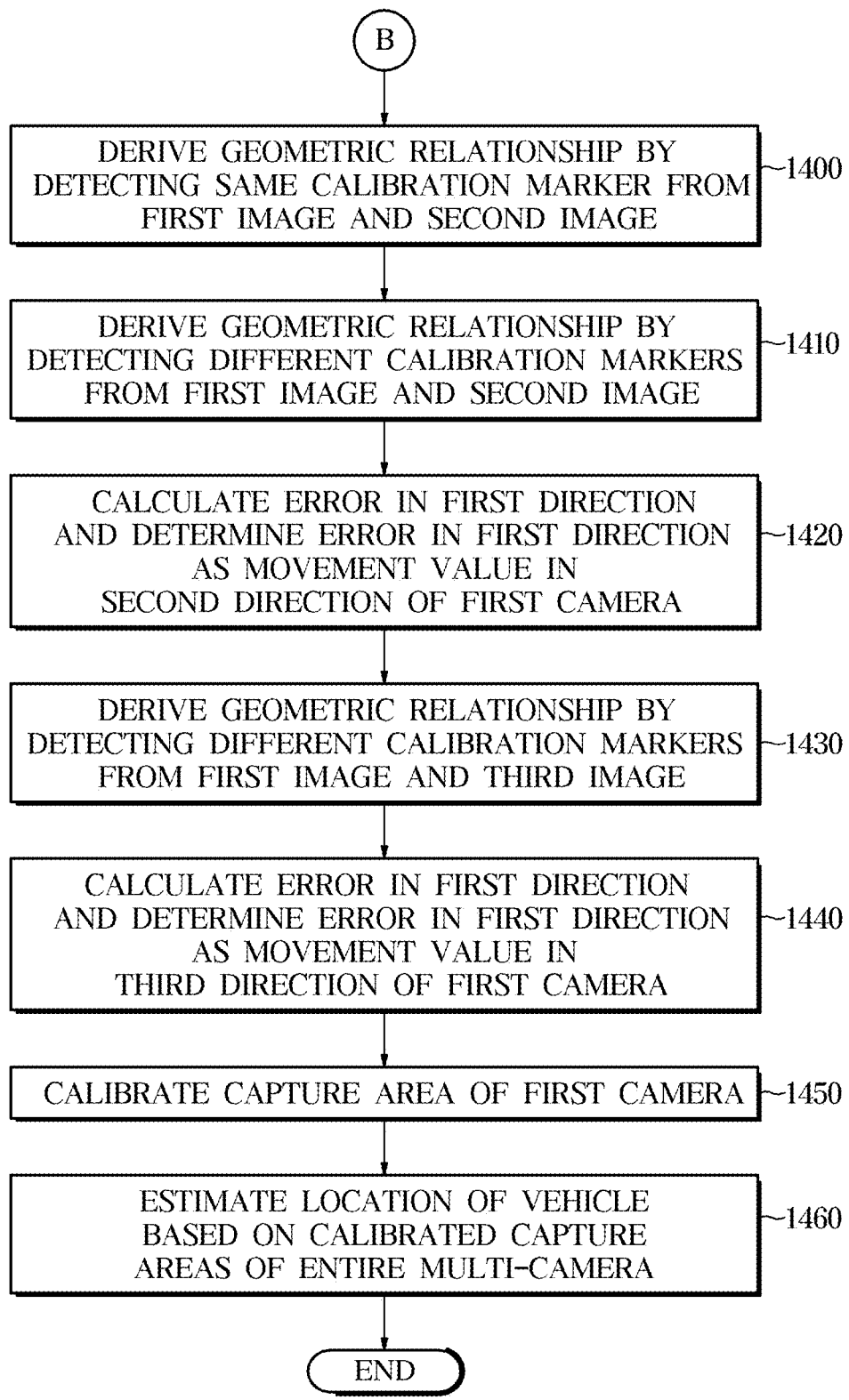

VEHICLE AND CONTROL METHOD THEREOF

CROSS-REFERENCE TO RELATED APPLICATIONS

This application claims the benefit of Korean Patent Application No. 10-2022-0108698, filed on Aug. 29, 2022, which application is hereby incorporated herein by reference.

TECHNICAL FIELD

The disclosure relates to a vehicle and a control method thereof.

BACKGROUND

A multi-camera is necessarily mounted on a vehicle equipped with an autonomous driving system or an advanced driver assistance system (ADAS) to recognize an object and obtain information related to the object.

In general, at least two cameras are required to obtain a capture area covering almost 360 degrees based on an object. When two cameras are used, however, an area that may not be captured by any camera may exist, resulting in a vehicle blind spot preventing a driver from obtaining information about an object around the vehicle.

Accordingly, a plurality of cameras may be mounted on a vehicle so that capture areas are overlapped to minimize a blind spot. To calibrate the plurality of cameras with the capture areas overlapped, an accurate camera calibration object is required.

Conventionally, manual operation is required to calibrate a plurality of cameras which is time-consuming. Therefore, a system for automatically calibrating a plurality of cameras is required.

SUMMARY

The disclosure relates to a vehicle and a control method thereof. Particular embodiments relate to a vehicle equipped with a multi-camera and a control method thereof.

An embodiment of the disclosure provides a vehicle and a control method thereof that may automatically calibrate a plurality of cameras capturing images around an object like a vehicle using a geometric relationship between perpendicularly positioned cameras.

Additional embodiments of the disclosure will be set forth in part in the description which follows and, in part, will be obvious from the description or may be learned by practice of the disclosure.

According to an embodiment of the disclosure, there is provided a vehicle equipped with a multi-camera including a plurality of cameras. The vehicle includes a first camera configured to capture an image around the vehicle, a second camera configured to capture an image in a second direction perpendicular to a first direction which is an optical axis direction of the first camera, a third camera configured to capture an image in a third direction perpendicular to each of the first direction and the second direction, and a controller configured to receive a first image captured by the first camera, a second image captured by the second camera, and a third image captured by the third camera, detect a calibration marker from each of the first image, the second image, and the third image, and calibrate a movement value in an optical axis direction of each of the first camera, the second camera, and the third camera, calibrate a movement value in the second direction of the first camera based on the calibrated movement value in the optical axis direction of the second camera, calibrate a movement value in the third direction of the first camera based on the calibrated movement value in the optical axis direction of the third camera, and calibrate a capture area of the first camera.

The controller may be configured to generate a reference camera to allow a shape of a detected calibration marker to be square and compare a shape of the calibration marker detected from each of the first image, the second image, and the third image with the shape of the calibration marker detected from the reference camera to calibrate the movement values in the optical axis direction of the first camera, the second camera, and the third camera.

The controller may be configured to determine a rotation value to allow the shape of the calibration marker detected from the first image, the second image, and the third image to be identical to the shape of the calibration marker detected from the reference camera and calibrate the movement values in the optical axis direction of the first camera, the second camera, and the third camera based on the rotation value.

The controller may be configured to calibrate the calibration marker detected from the first image, the second image, and the third image based on the rotation value and determine a distance to the calibration marker to be inversely proportional to an area of the calibration marker to calibrate the movement values in the optical axis direction of the first camera, the second camera, and the third camera.

The controller may be configured to calculate an error in the first direction, based on a geometric relationship between the first camera and the second camera derived by detecting a same calibration marker from the first image and the second image and the geometric relationship derived by converting different calibration markers from the first image and the second image into a coordinate system of the vehicle.

The controller may be configured to calibrate the capture area of the first camera by determining the error in the first direction as the movement value in the second direction of the first camera.

The controller may be configured to calculate an error in the first direction, based on a geometric relationship between the first camera and the third camera derived by detecting a same calibration marker from the first image and the third image and the geometric relationship derived by converting different calibration markers from the first image and the third image into a coordinate system of the vehicle.

The controller may be configured to calibrate the capture area of the first camera by determining the error in the first direction as the movement value in the third direction of the first camera.

The controller may be configured to estimate a location of the vehicle by calibrating capture areas of the second camera and the third camera based on the calibrated capture area of the first camera.

The controller may be configured to determine a location of the multi-camera based on the calibrated capture areas of the multi-camera mounted on the vehicle and estimate the location of the vehicle based on the location of the multi-camera.

According to an embodiment of the disclosure, there is provided a control method of a vehicle including a first camera capturing an image around the vehicle, a second camera capturing an image in a second direction perpendicular to a first direction which is an optical axis direction of the first camera as an optical axis direction of the second camera, and a third camera capturing an image in a third direction perpendicular to each of the first direction and the second direction as an optical axis direction of the third camera. The control method includes receiving a first image captured by the first camera, a second image captured by the second camera, and a third image captured by the third camera, detecting a calibration marker from the first image, the second image, and the third image, calibrating a movement value in an optical axis direction of each of the first camera, the second camera, and the third camera, calibrating a movement value in the second direction of the first camera based on the calibrated movement value in the optical axis direction of the second camera, and calibrating a movement value in the third direction of the first camera based on the calibrated movement value in the optical axis direction of the third camera and calibrating a capture area of the first camera.

The calibrating of the movement value in the optical axis direction may include generating a reference camera to allow a shape of a detected calibration marker to be square and comparing a shape of the calibration marker detected from each of the first image, the second image, and the third image with the shape of the calibration marker detected from the reference camera to calibrate the movement values in the optical axis direction of the first camera, the second camera, and the third camera.

The calibrating of the movement value in the optical axis direction may include determining a rotation value to allow the shape of the calibration marker detected from the first image, the second image, and the third image to be identical to the shape of the calibration marker detected from the reference camera and calibrating the movement values in the optical axis direction of the first camera, the second camera, and the third camera based on the rotation value.

The calibrating of the movement value in the optical axis direction may include calibrating the first camera, the second camera, and the third camera based on the rotation value and determining a distance to the calibration marker to be inversely proportional to an area of the calibration marker to calibrate the movement values in the optical axis direction of the first camera, the second camera, and the third camera.

The calibrating of the capture area of the first camera may include calculating an error in the first direction, based on a geometric relationship between the first camera and the second camera derived by detecting a same calibration marker from the first image and the second image and the geometric relationship derived by converting different calibration markers from the first image and the second image into a coordinate system of the vehicle.

The calibrating of the capture area of the first camera may calibrate the capture area of the first camera by determining the error in the first direction as the movement value in the second direction of the first camera.

The calibrating of the capture area of the first camera may include calculating an error in the first direction, based on a geometric relationship between the first camera and the third camera derived by detecting a same calibration marker from the first image and the third image and the geometric relationship derived by converting different calibration markers from the first image and the third image into a coordinate system of the vehicle.

The calibrating of the capture area of the first camera may calibrate the capture area of the first camera by determining the error in the first direction as the movement value in the third direction of the first camera.

The control method may further include estimating a location of the vehicle by calibrating capture areas of the second camera and the third camera based on the calibrated capture area of the first camera.

The control method may further include determining a location of a multi-camera mounted on the vehicle based on calibrated capture areas of the multi-camera and estimating the location of the vehicle based on the location of the multi-camera.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 13 is a flowchart illustrating a control method of a vehicle according to an embodiment; and FIG. 14 is a flowchart illustrating a control method of a vehicle according to an embodiment continued from FIG. 13.

DETAILED DESCRIPTION OF ILLUSTRATIVE EMBODIMENTS

Figure 1:
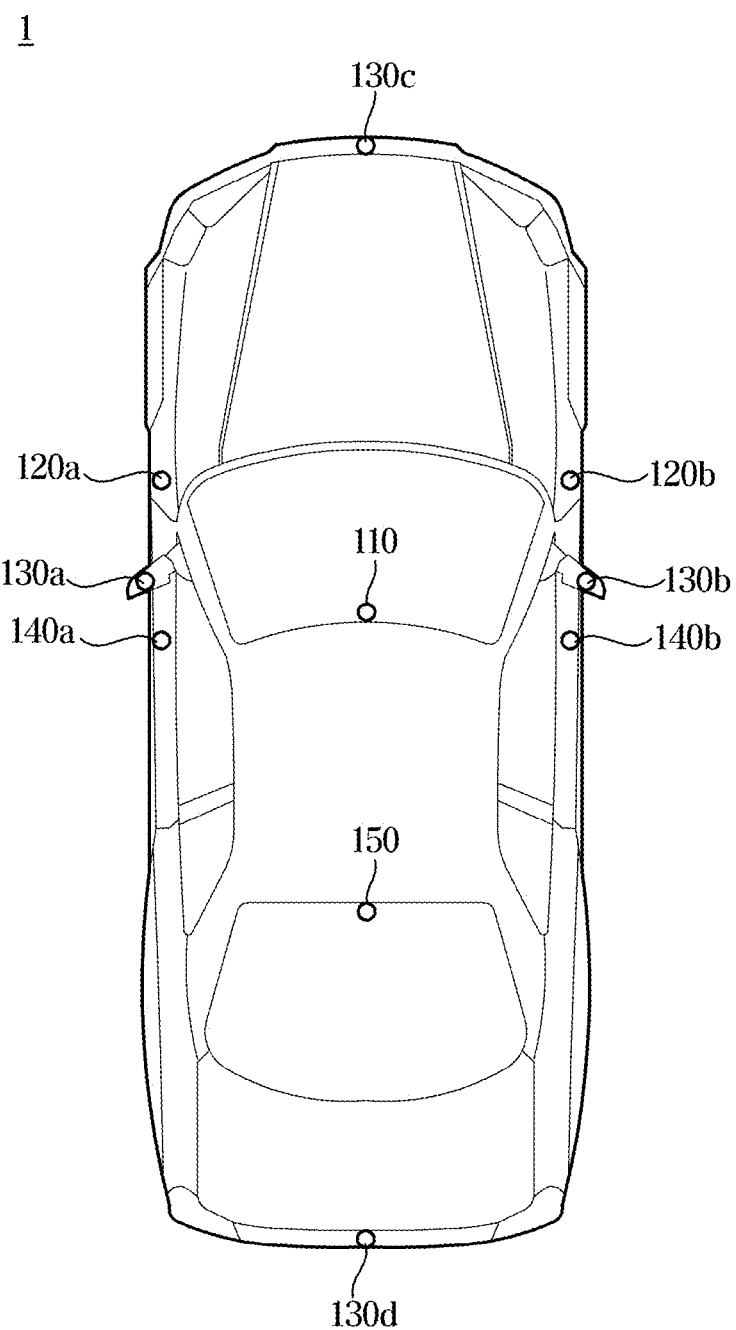
FIG. 1 is a diagram illustrating a disposition of a plurality of cameras provided in a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "—part", "—member", "—module", "—block", and the like may refer to at least one process processed by at least one hardware or software. According to embodiments, a plurality of "—parts", "—members", "—modules", "—blocks" may be embodied as a single element, or a single of "—part", "—member", "—module", "—block" may include a plurality of elements.

It will be understood that when an element is referred to as being "connected" to another element, it can be directly or indirectly connected to the other element, wherein the indirect connection includes "connection" via a wireless communication network.

It will be further understood that the term "include" when used in this specification specifies the presence of stated features, integers, steps, operations, elements, and/or components, but does not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 2:
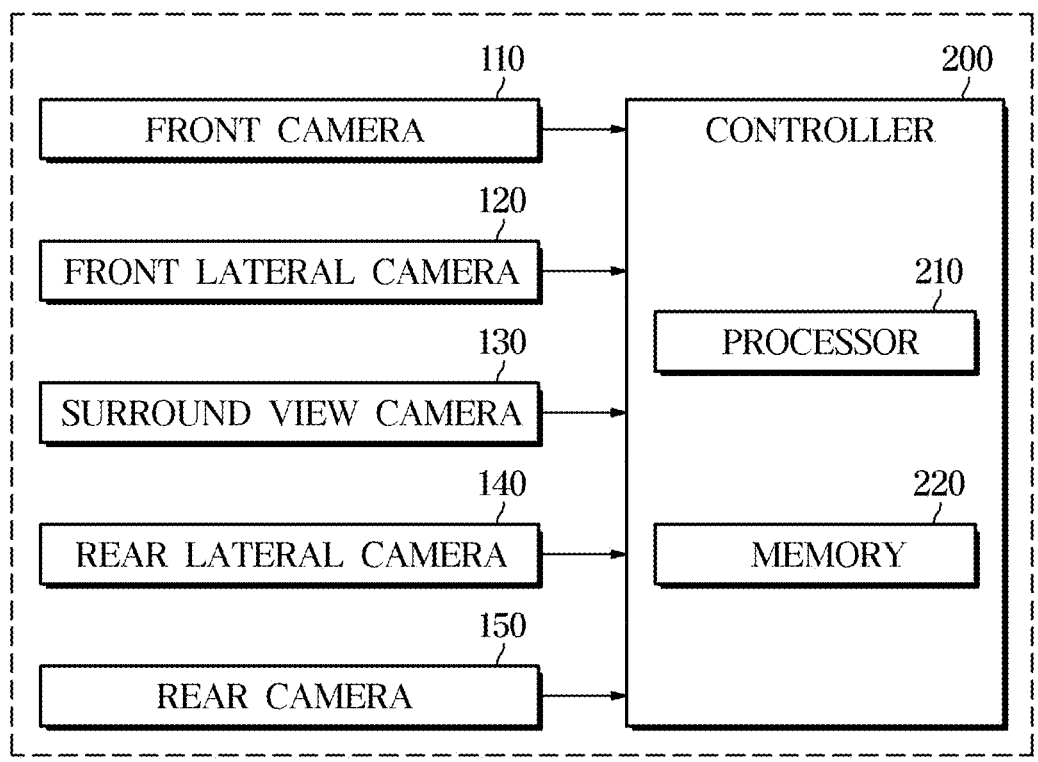
FIG. 2 is a control block diagram illustrating a vehicle according to an embodiment.

FIG. 1 is a diagram illustrating a disposition of a plurality of cameras provided in a vehicle according to an embodiment. FIG. 2 is a control block diagram illustrating a vehicle according to an embodiment.

A controller 200 of a vehicle 1 may assist a driver in operating (driving, braking, and steering) the vehicle 1. For example, the vehicle 1 may detect surroundings of the vehicle 1 (e.g., other vehicles, pedestrians, cyclists, lanes, traffic signs, etc.) and control driving and/or braking and/or steering of the vehicle 1 in response to the detected surroundings. Hereinafter, an object includes any object that may collide with the vehicle 1 in motion, such as another vehicle, cyclists, and the like.

The vehicle 1 may provide a variety of functions to a driver. For example, the vehicle 1 may provide functions such as a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

In order to provide the above various functions, as shown in FIG. 1, cameras may be provided in the vehicle 1 at different locations. Although not illustrated in FIG. 1, radars and lidars may be provided in the vehicle 1 to perform the above-described functions in addition to the cameras.

A front camera 110, front lateral cameras 120 (120*a* and 120*b*), surround view cameras 130 (130*a*, 130*b*, 130*c*, and 130*d*), rear lateral cameras 140 (140*a* and 140*b*), and a rear camera 150 may be provided in the vehicle 1, thereby implementing a multi-camera.

The front camera 110 may be mounted on a front windshield of the vehicle 1 to secure a field of view facing a front of the vehicle 1. The front camera 110 may capture the front of the vehicle 1 and obtain front image data. The front camera 110 may detect an object moving in front of the vehicle 1 or an object travelling in adjacent lanes in a front lateral view. The front image data of the vehicle 1 may include location information about at least one of other vehicles, pedestrians, cyclists, lanes, curbs, guardrails, street trees, streetlights, and the like, located in front of the vehicle 1.

The front lateral cameras 120 (120*a* and 120*b*) may be mounted on front lateral sides of the vehicle 1 such as an A pillar, a B pillar, etc., to secure fields of view facing front lateral sides of the vehicle 1. The front lateral cameras 120 may capture the front lateral sides of the vehicle 1 and obtain front lateral image data of the vehicle 1.

The surround view cameras 130 (130*a*, 130*b*, 130*c*, and 130) may be mounted on side mirrors (not shown) of the vehicle 1 to secure fields of view facing lower lateral sides of the vehicle 1. The surround view cameras 130 may capture the lower lateral sides of the vehicle 1 and obtain lower lateral image data of the vehicle 1.

The rear lateral cameras 140 (140*a* and 140*b*) may be mounted on rear lateral sides of the vehicle 1 such as a C pillar to secure fields of view facing the rear lateral sides of the vehicle 1. The rear lateral cameras 140 may capture the rear lateral sides of the vehicle 1 and obtain rear lateral image data of the vehicle 1.

The rear camera 150 may be mounted on a rear side of the vehicle 1 such as on a rear bumper of the vehicle 1 or on a rear windshield of the vehicle 1 to secure a field of view facing a rear of the vehicle 1. The rear camera 150 may capture the rear of the vehicle 1 and obtain rear image data of the vehicle 1.

Hereinafter, for convenience of description, at least two of the front camera 110, the front lateral cameras 120 (120*a* and 120*b*), the surround view cameras 130 (130*a*, 130*b*, 130*c*, and 130*d*), the rear lateral cameras 140 (140*a* and 140*b*), or the rear camera 150 are referred to as the multi-camera. Although a multi-camera system including ten cameras is illustrated in FIG. 1, the number of cameras is not limited thereto.

The controller 200 may obtain a plurality of images captured by the multi-camera and may generate a stereoscopic image considering a geometric relationship among the plurality of images. In this instance, the controller 200 may obtain more physical information about an object than an image captured by a single camera.

The controller 200 may include an image signal processor 210 which is a processor 210 processing image data of the multi-camera and/or a micro control unit (MCU) generating a braking signal, and the like.

When an autonomous driving system is in operation, the controller 200 may identify objects in the image based on the image data obtained by the front camera 110 and may determine whether the objects in the image are stationary or in motion by comparing information about the identified objects with object information stored in a memory 220.

The memory 220 may store a program and/or data for processing image data, a program and/or data for processing radar data, and a program and/or data for the processor 210 to generate a braking signal and/or a warning signal.

When the processor 210 processes the image obtained by the multi-camera and obtains data about a height, distance, and aspect ratio of the object, the memory 220 may temporarily store a result of processing the data, i.e., a characteristic relationship, three-dimensional (3D) coordinate values, 3D straight line equations, etc.

Also, the memory 220 may store parallax information which is a geometric difference among the cameras of the multi-camera obtained in a camera calibration process performed before the vehicle 1 is shipped. The parallax information is based on locations of cameras stored in an offline camera calibration (OCC) before shipment.

The memory 220 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), and a recording medium such as a hard disk drive (HDD), a compact disc read only memory (CD-ROM), and the like, without being limited thereto.

The controller 200 may receive a first image captured by a first camera, a second image captured by a second camera, and a third image captured by a third camera. Here, the first to third cameras are included in the multi-camera.

In this instance, the first camera may refer to a camera to be calibrated, and the second camera and the third camera are cameras for calibrating the first camera. The second camera may be in a perpendicular relationship with the first camera and the third camera, and the third camera may be in a perpendicular relationship with the first camera and the second camera.

Afterwards, the controller 200 may detect a calibration marker from the first image, the second image, and the third image and may calibrate a movement value in an optical axis direction of each of the first camera, the second camera, and the third camera. Here, the optical axis direction may refer to a z-axis which is a direction to which a camera lens is directed.

The controller 200 may calibrate a movement value in a second direction of the first camera based on the calibrated movement value in the optical axis direction of the second camera and may calibrate a movement value in a third direction of the first camera based on the calibrated movement value in the optical axis direction of the third camera, thereby calibrating a capture area of the first camera.

Also, the controller 200 may generate a reference camera to allow a shape of a detected calibration marker to be square and may compare a shape of the calibration marker detected from each of the first image, the second image, and the third image with the shape of the calibration marker detected from the reference camera, thereby calibrating the movement values in the optical axis direction of the first camera, the second camera, and the third camera.

The controller 200 may determine a rotation value to allow the shape of the calibration marker detected from the first image, the second image, and the third image to be identical to the shape of the calibration marker detected from the reference camera and may calibrate the movement values in the optical axis direction of the first camera, the second camera, and the third camera based on the rotation value.

The controller 200 may calibrate the calibration marker detected from the first image, the second image, and the third image based on the rotation value and may determine a distance to the calibration marker to be inversely proportional to an area of the calibration marker, thereby calibrating the movement values in the optical axis direction of the first camera, the second camera, and the third camera.

The controller 200 may calculate an error in the first direction based on a geometric relationship between the first camera and the second camera derived by detecting a same calibration marker from the first image and the second image and the geometric relationship derived by converting different calibration markers from the first image and the second image into a coordinate system of the vehicle 1. Afterwards, the controller 200 may determine the error in the first direction as the movement value in the second direction of the first camera, thereby calibrating the capture area of the first camera.

The controller 200 may calculate an error in the first direction based on a geometric relationship between the first camera and the third camera derived by detecting a same calibration marker from the first image and the third image and the geometric relationship derived by converting different calibration markers from the first image and the third image into a coordinate system of the vehicle 1. Afterwards, the controller 200 may determine the error in the first direction as the movement value in the third direction of the first camera, thereby calibrating the capture area of the first camera.

Accordingly, the controller 200 may calibrate the capture area of the first camera and may calibrate the entire capture areas of the multi-camera provided in the vehicle 1.

The controller 200 may also estimate a location of the vehicle 1 by calibrating capture areas of the second camera and the third camera based on the calibrated capture area of the first camera. Specifically, based on the calibrated capture areas of the multi-camera mounted on the vehicle 1, the controller 200 may determine locations of the multi-camera and estimate the location of the vehicle 1 based on the locations of the multi-camera.

Hereinafter, automatic calibration of the multi-camera and a method of estimating a location of the vehicle 1 are briefly described with reference to FIGS. 3A and 3B together with FIGS. 4 to 12.

Figure 3A:
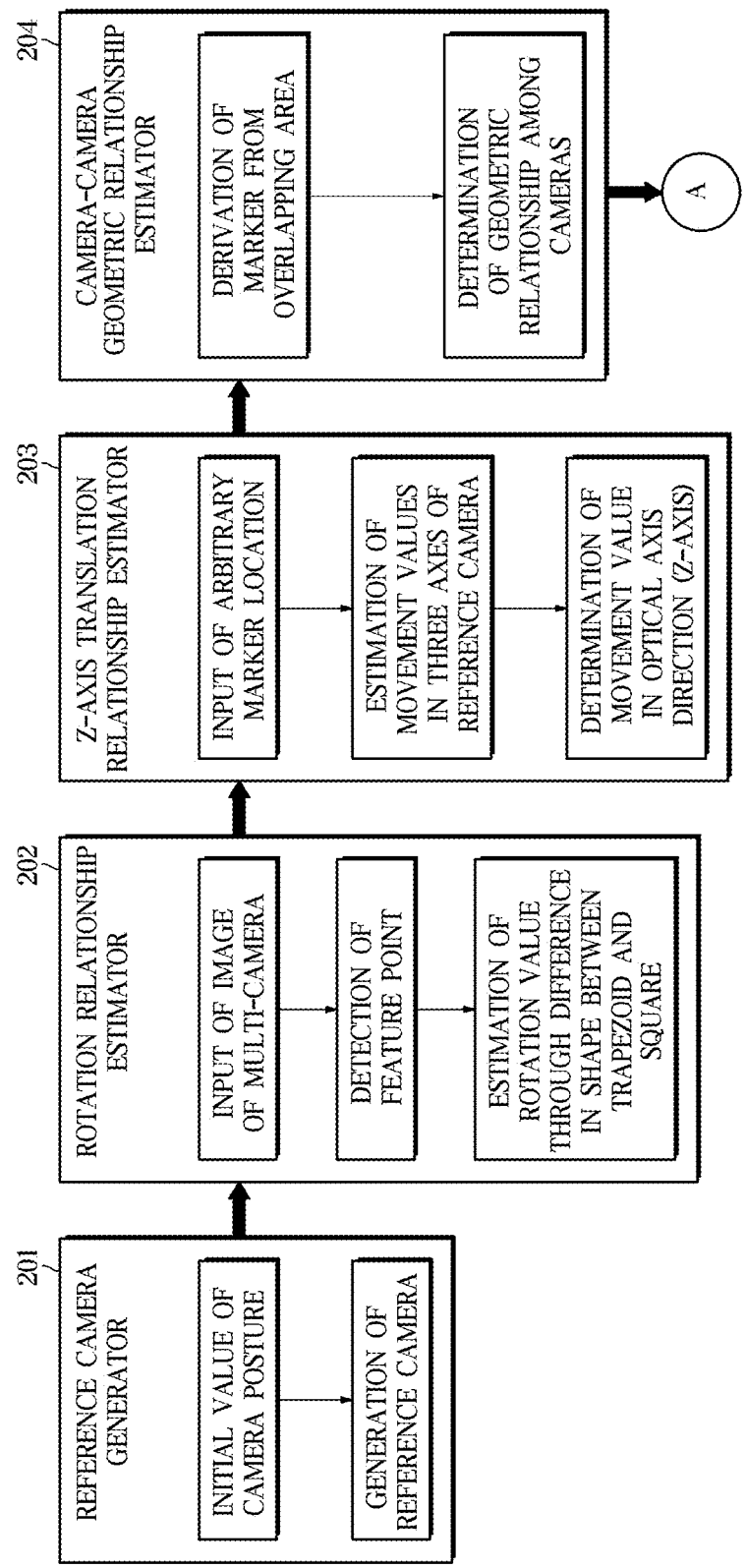
FIGS. 3A and 3B are block diagrams illustrating functions of a controller according to an embodiment.
Figure 3B:
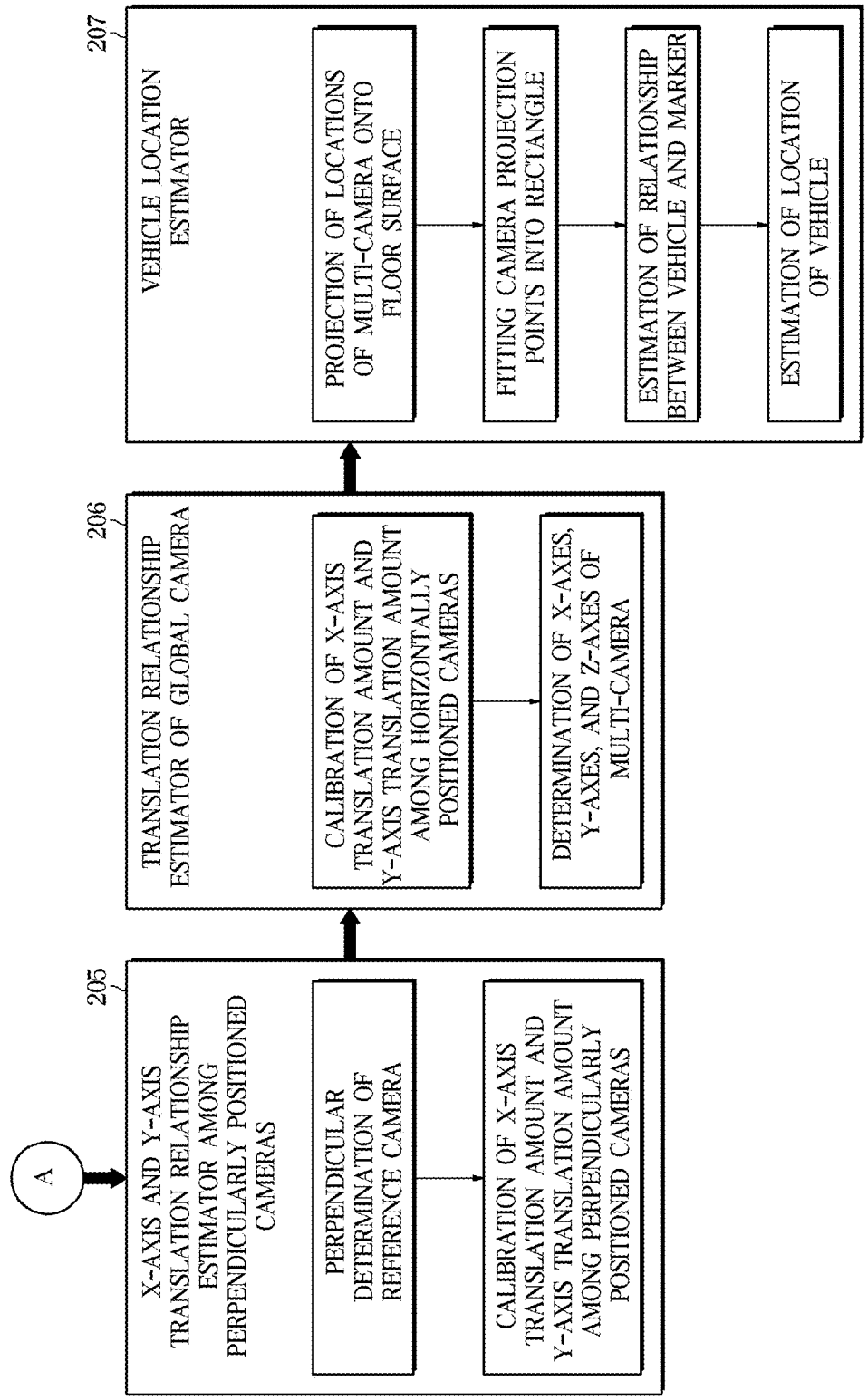

FIGS. 3A and 3B are block diagrams illustrating functions of a controller according to an embodiment.

The controller 200 may include a reference camera generator 201 to easily utilize a geometric relationship among cameras included in a multi-camera. Specifically, the controller 200 may generate a reference camera based on an initial value of a camera posture.

Figure 4:
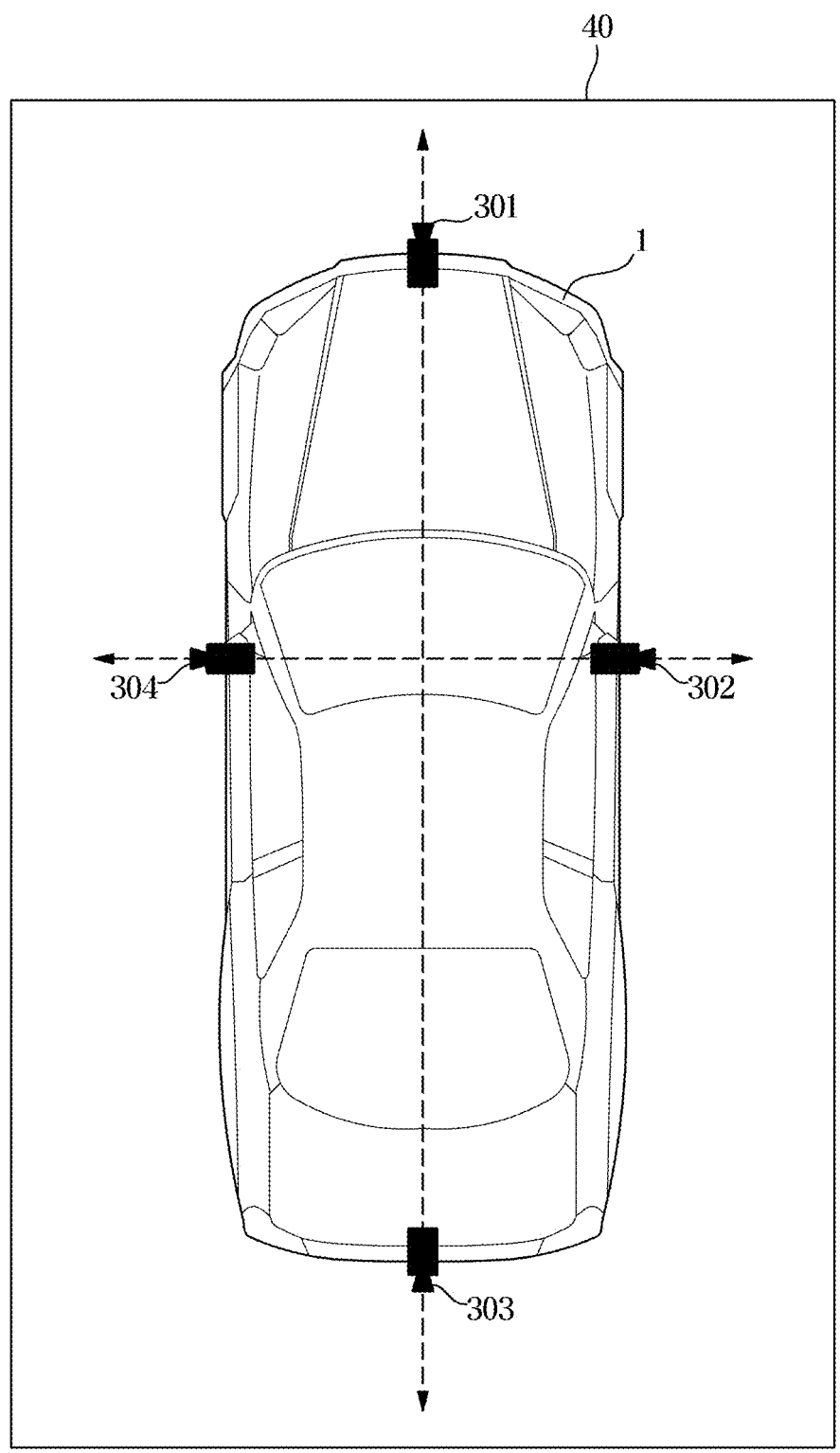
FIG. 4 is a diagram illustrating a reference camera generated by a controller according to an embodiment.

Referring to FIG. 4, FIG. 4 is a diagram illustrating a reference camera generated by a controller according to an embodiment.

In this instance, each of reference cameras 301, 302, 303, and 304 may refer to a virtual camera whose optical axis, which is a shooting direction (a field of view), is perpendicular to a wall 40 of equipment where a calibration marker is installed and may be stored in the memory 220 in a form of reference data about locations and shooting directions of the multi-camera.

The calibration marker installed on the wall 40 of the equipment may be square in shape, and a capture area of a first camera may be calibrated based on a shape of the marker captured by the reference cameras 301, 302, 303, and 304. That is, each of the reference cameras 301, 302, 303, and 304 is installed so that the optical axis thereof is perpendicular to the wall 40 where the marker is installed, and thus all the calibration markers are displayed as a square in images captured by the reference cameras 301, 302, 303, and 304.

Referring again to FIG. 3A, the controller 200 may include a rotation relationship estimator 202 to derive a geometric relationship between the first camera and a calibration marker. The controller 200 may receive an image from the first camera capturing the calibration marker, and when feature points of the captured calibration marker are detected, the calibration marker may be displayed in an arbitrary trapezoidal shape, not a square. In this instance, the controller 200 may compare the trapezoidal calibration marker detected from the first camera that requires calibration with a square calibration marker detected from the reference cameras 301, 302, 303, and 304, and assume a difference in shape of calibration marker as an error.

Afterwards, the controller 200 may derive rotation parameters minimizing the error, and the rotation parameters derived by the controller 200 may indicate a rotation relationship among the first camera and the reference cameras 301, 302, 303, and 304.

That is, the controller 200 may derive the rotation relationship among the first camera and the reference cameras 301, 302, 303, and 304, and because the reference cameras 301, 302, 303, and 304 are in a perpendicular relationship with the calibration marker, a relationship between the first camera and the calibration marker may be derived.

The controller 200 may include a z-axis translation relationship estimator 203 and may estimate a z-axis translation relationship based on the rotation relationship estimated by the rotation relationship estimator 202. That is, the controller 200 may input an arbitrary marker location and may estimate movement values in three axes of each of the reference cameras 301, 302, 303, and 304, thereby determining a movement value in an optical axis direction.

Figure 5:
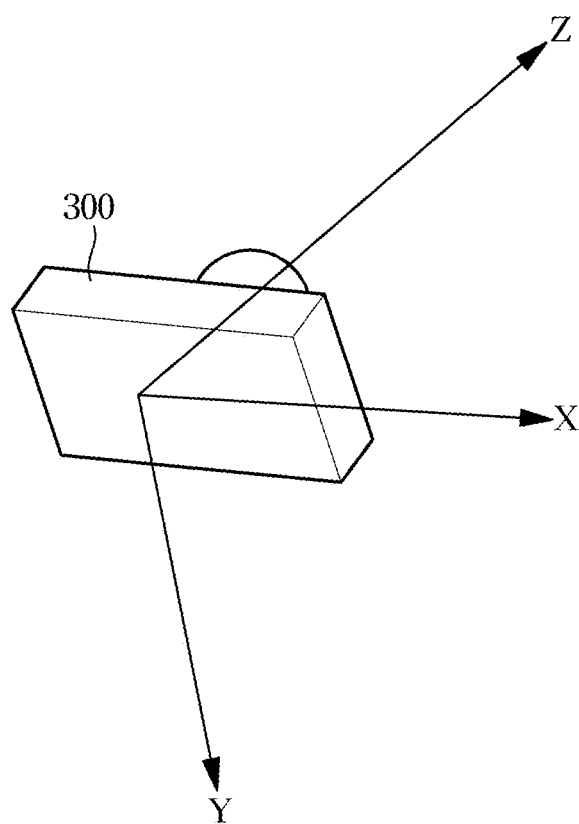
FIG. 5 is a diagram illustrating a relationship among an x-axis, y-axis, and z-axis of a reference camera according to an embodiment.

Referring to FIG. 5, FIG. 5 is a diagram illustrating a relationship among an x-axis, y-axis, and z-axis of the reference camera 300 according to an embodiment. Although the x-axis, y-axis, and z-axis of the reference camera 300 may be variously defined, for the reference camera 300 of the vehicle 1 according to an embodiment, an optical axis direction, which is a direction in which a lens views, is defined as the z-axis, an axis perpendicular to the optical axis direction and extending left/right is defined as the x-axis, and an axis perpendicular to the optical axis direction and extending up/down is defined as the y-axis.

Referring again to FIG. 3A, specifically, the controller 200 derived the rotation value of the first camera through the rotation relationship estimator 202, and when the rotation value is applied to the first camera, the calibration marker captured by the first camera may be displayed as a square.

The controller 200 may estimate the z-axis translation relationship through perspective based on a size of the calibration marker captured by the first camera. That is, when the size of the calibration marker captured by the first camera is greater than a size of the calibration marker captured by the reference camera 300, the controller 200 determines that a positive (+) error exists based on the z-axis. When the size of the calibration marker captured by the first camera is less than the size of the calibration marker captured by the reference camera 300, the controller 200 determines that a negative (−) error exists.

For example, when the calibration marker is captured at a distance of 1 m from the reference camera 300, the calibration marker is taken in a form of 20 pixels×20 pixels. When the same calibration marker is captured by the first camera and is taken in a form of 19 pixels×19 pixels, the controller 200 may determine that a z-axis error is a negative (−) error and may calibrate the z-axis.

The controller 200 may include a camera-camera geometric relationship estimator 204 and may derive a geometric relationship among the multi-camera.

Figure 6:
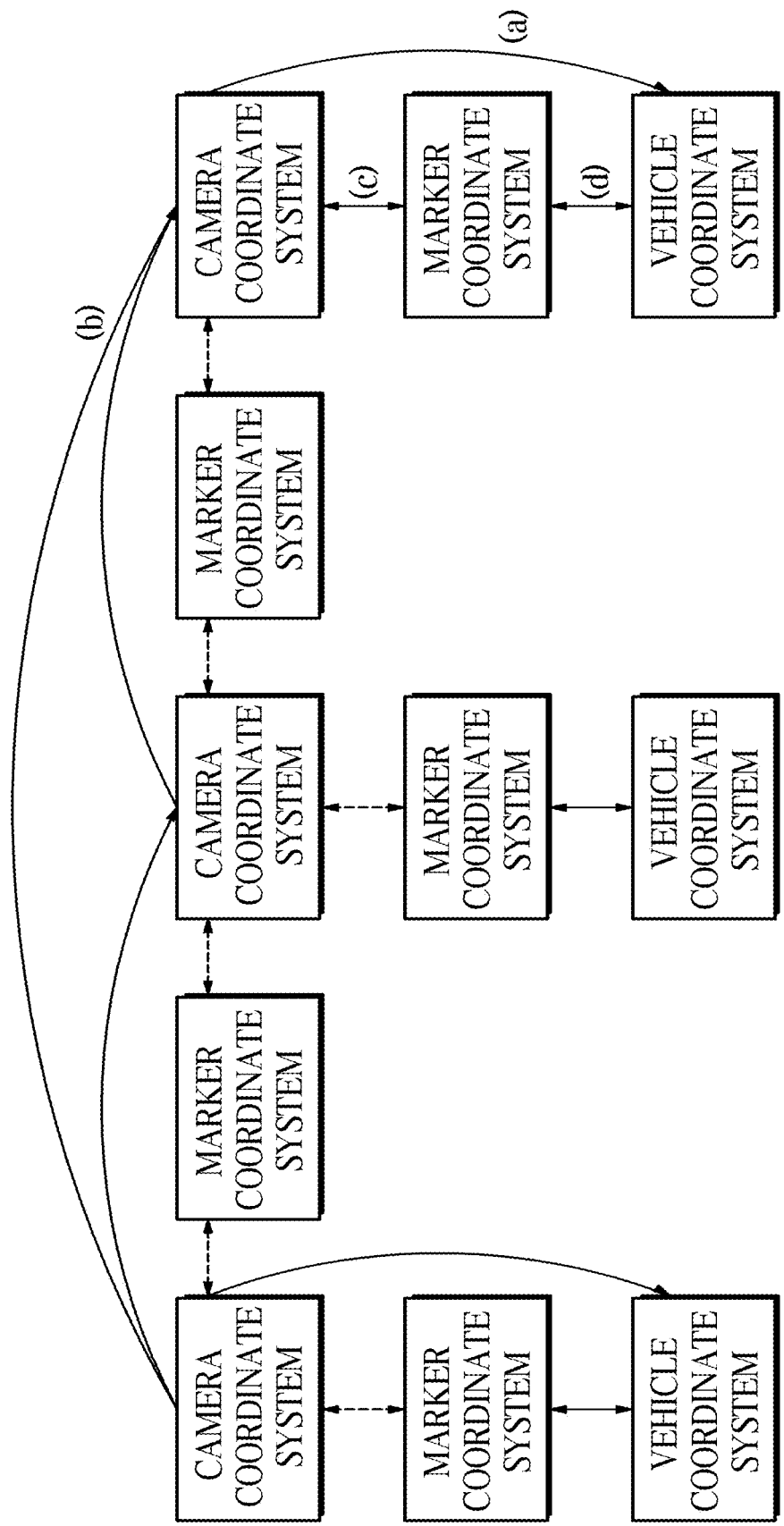
FIG. 6 is a diagram illustrating a relationship of coordinate systems in a vehicle according to an embodiment.
Figure 7:
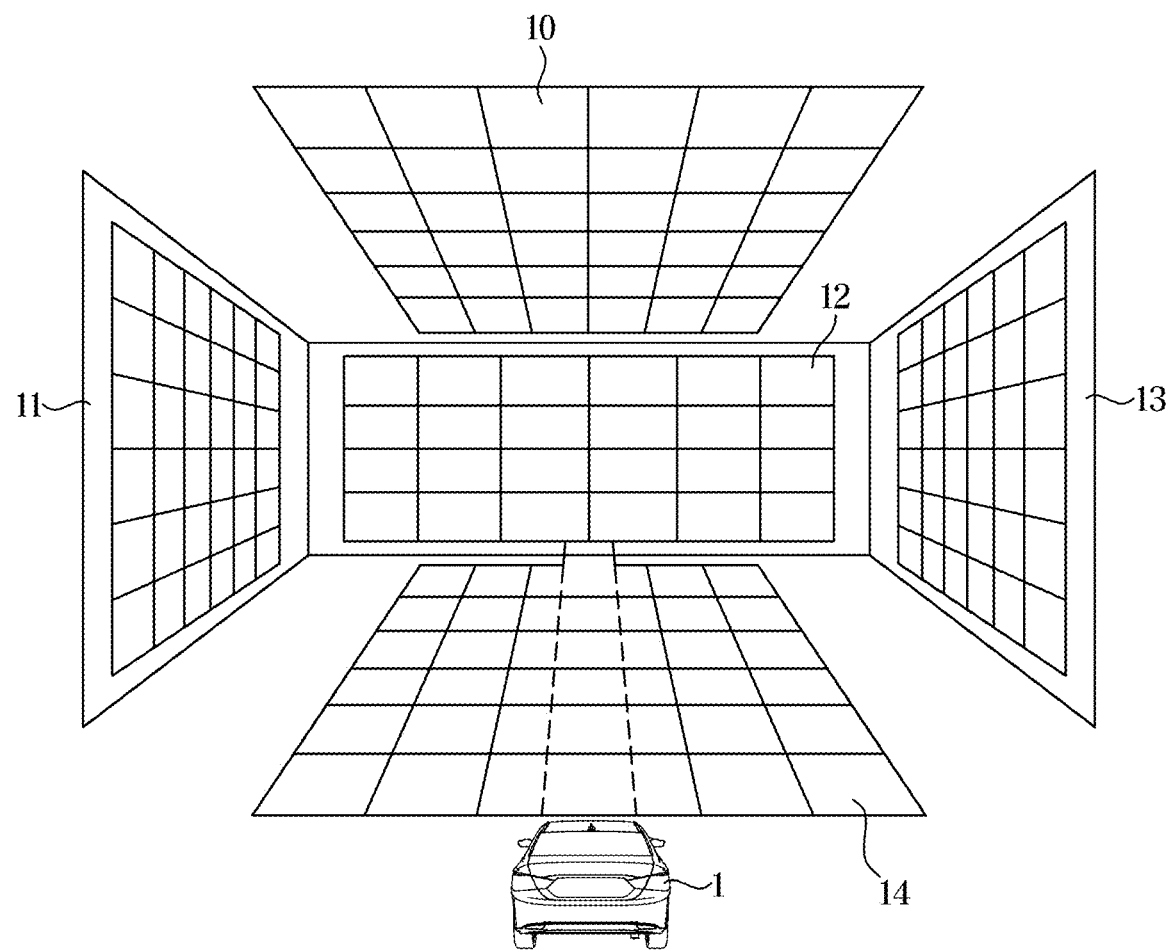
FIG. 7 is a diagram illustrating calibration equipment for a multi-camera of a vehicle according to an embodiment.
Figure 8A:
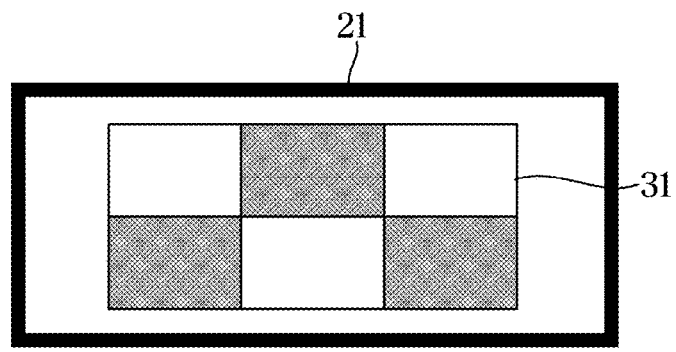
FIGS. 8A and 8B are diagrams illustrating a calibration marker according to an embodiment.
Figure 8B:
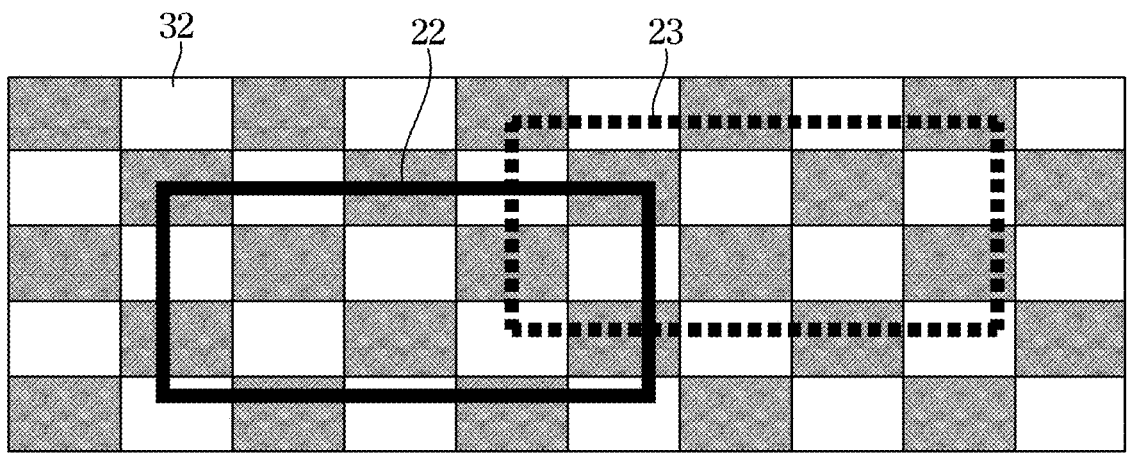

In order to describe a geometric relationship among cameras, referring to FIGS. 6, 7, and 8, FIG. 6 is a diagram illustrating a relationship of coordinate systems in a vehicle according to an embodiment, FIG. 7 is a diagram illustrating calibration equipment for a multi-camera of a vehicle according to an embodiment, and FIGS. 8A and 8B are diagrams illustrating a calibration marker according to an embodiment.

Referring to FIG. 6, in order for the controller 200 to estimate a location of an object recognized around the vehicle 1, information about a geometric relationship (a) between the vehicle 1 and a camera and information about a geometric relationship (b) between a camera and another camera is required. According to embodiments of the disclosure, the geometric relationship (a) between the vehicle 1 and the camera and the geometric relationship (b) between the camera and the other camera may be derived based on a relationship among perpendicularly positioned cameras.

In this instance, the controller 200 may estimate a geometric relationship (c) between a camera and a marker from an optimization algorithm and may derive a geometric relationship (d) between the vehicle 1 and a marker by direct measurement.

The above-described geometric relationships may be expressed as six parameters of 3D rotation and translation. Also, as shown in FIG. 7, a dedicated space for camera calibration where a calibration marker is installed around the vehicle 1 is required to estimate the geometric relationship (a) between the vehicle 1 and a camera and the geometric relationship (b) between the camera and the other camera. That is, calibration equipment may include calibration equipment where fixed calibration markers are located at a top side 10, a left side 11, a front side 12, a right side 13, and a bottom side 14 based on the vehicle 1. Accordingly, calibration to correct an error may be performed by capturing the fixed calibration markers by the multi-camera and calculating an error.

In existing camera calibration equipment, equipment or sensors capable of providing an accurate location of a fixed marker for accuracy of a geometric relationship (c) between a camera and a marker and capable of precisely measuring a parking location of a vehicle for accuracy of a geometric relationship (d) between a vehicle and a marker were used.

Specifically, referring to FIG. 8A, for a single camera, a calibration marker 31 is included in a capture area 21 of the camera, and thus a shooting position of the camera may be accurately identified. As shown in FIG. 8B, however, for the multi-camera including two or more cameras, it may not be identified which camera captures a first area 22 or a second area 23, and thus a capture area of each camera is required to be identified.

Conventionally, calibration was performed by manually inputting which area each camera is capturing. However, according to an embodiment, the controller 200 of the vehicle 1 may estimate which area each camera included in the multi-camera is capturing using a geometric relationship among perpendicularly positioned cameras and may automatically perform calibration of the multi-camera, even when a parking location of the vehicle 1 is not accurately measured. Accordingly, the controller 200 may also estimate a location of the vehicle 1.

Referring again to FIG. 3A, specifically, the controller 200 may derive a geometric relationship among cameras by capturing same marker coordinate points (a first method) or may derive a geometric relationship among cameras by capturing different marker coordinate points (a second method).

That is, the controller 200 may derive a relative relationship among cameras by capturing the same marker coordinate points which are overlapping regions and may derive the geometric relationship among cameras by capturing the different marker coordinate points and applying to a coordinate system of the vehicle 1.

In this instance, in the second method of capturing the different marker coordinate points and applying to the coordinate system of the vehicle 1, the controller 200 may derive the geometric relationship among cameras from a result value of the z-axis translation relationship estimator 203. That is, the controller 200 may derive the relative relationship among cameras where a z-axis translation amount is not calibrated through the first method and may derive the geometric relationship among cameras where the z-axis translation amount is calibrated through the second method. Accordingly, by comparing the first method and the second method, a translation relationship in the x-axis and the y-axis may be estimated based on a geometric error among perpendicularly positioned cameras.

Figure 9:
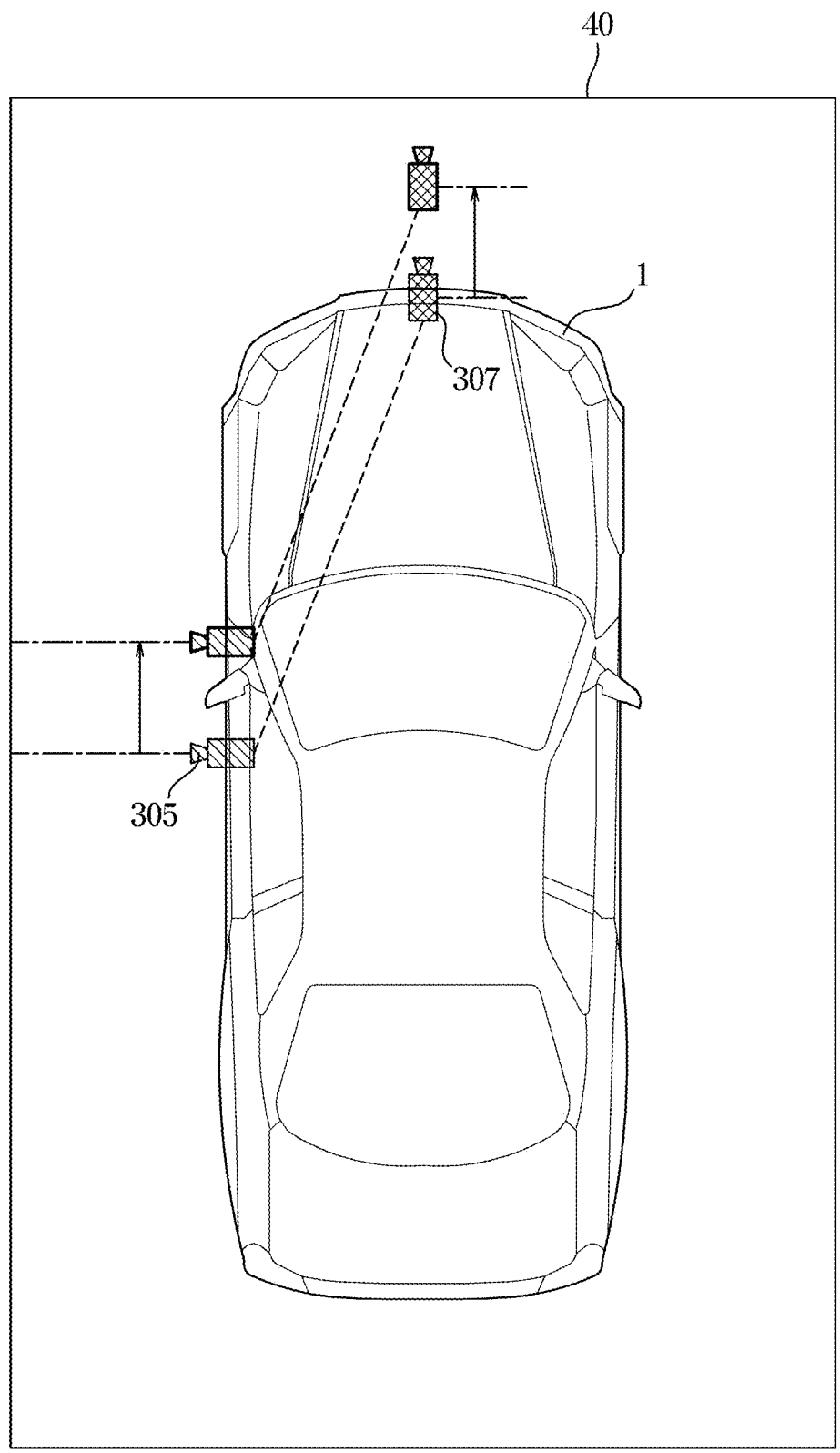
FIG. 9 is a diagram illustrating a perpendicular relationship among cameras provided in a vehicle according to an embodiment.
Figure 10:
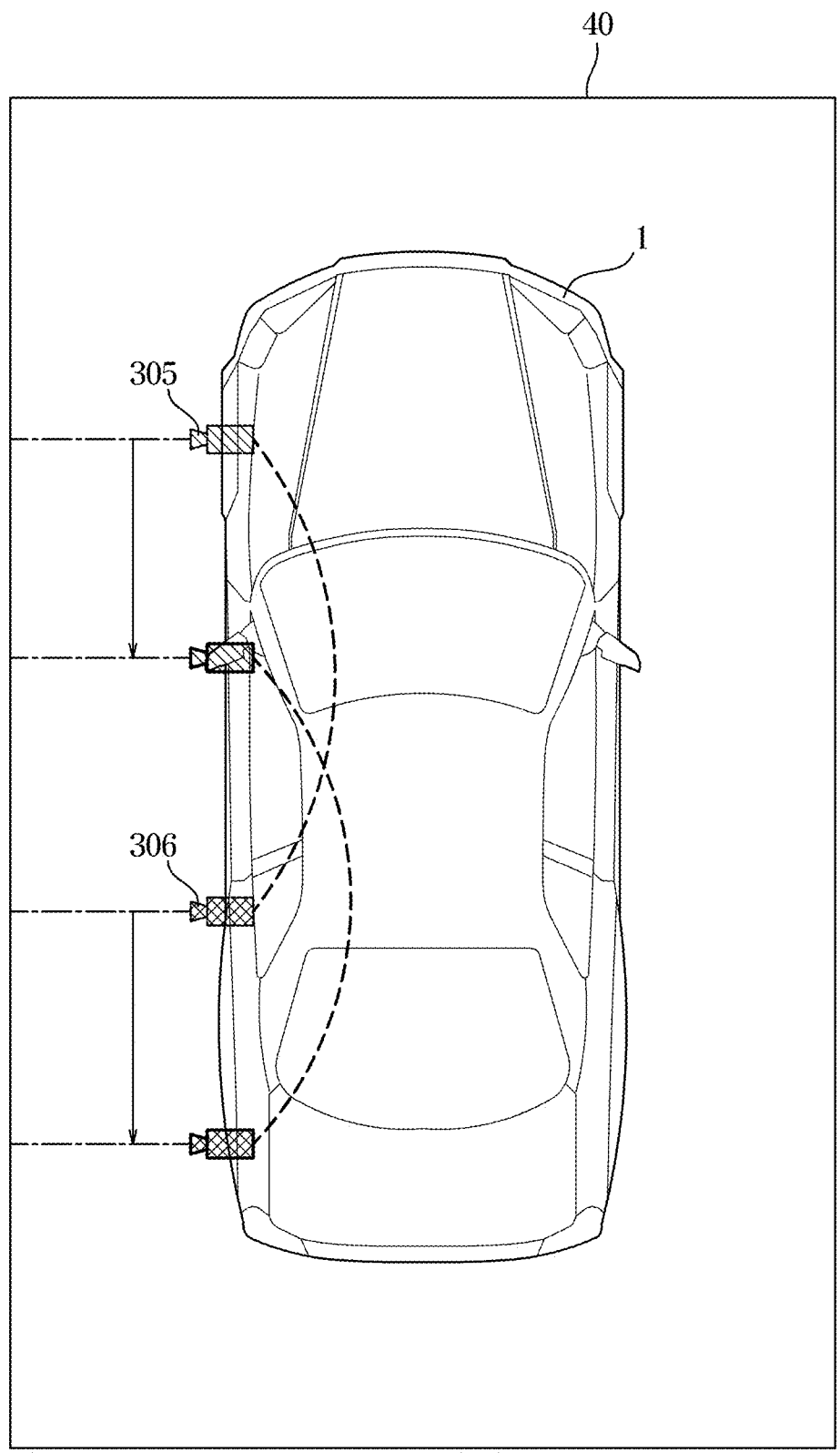
FIG. 10 is a diagram illustrating a horizontal relationship among cameras provided in a vehicle according to an embodiment.
Figure 11:
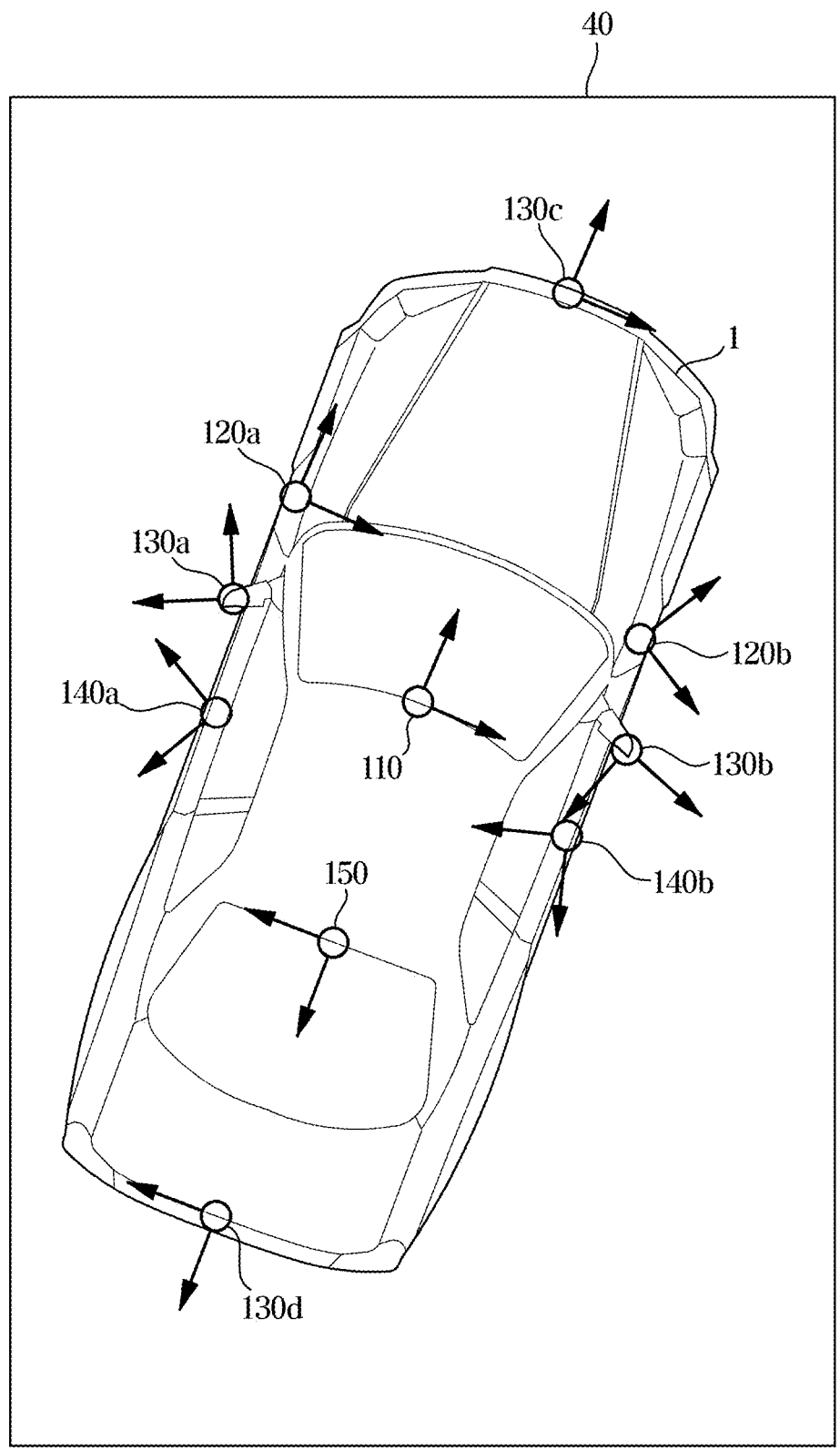
FIG. 11 is a diagram illustrating position and direction information of a multi-camera provided in a vehicle according to an embodiment.
Figure 12:
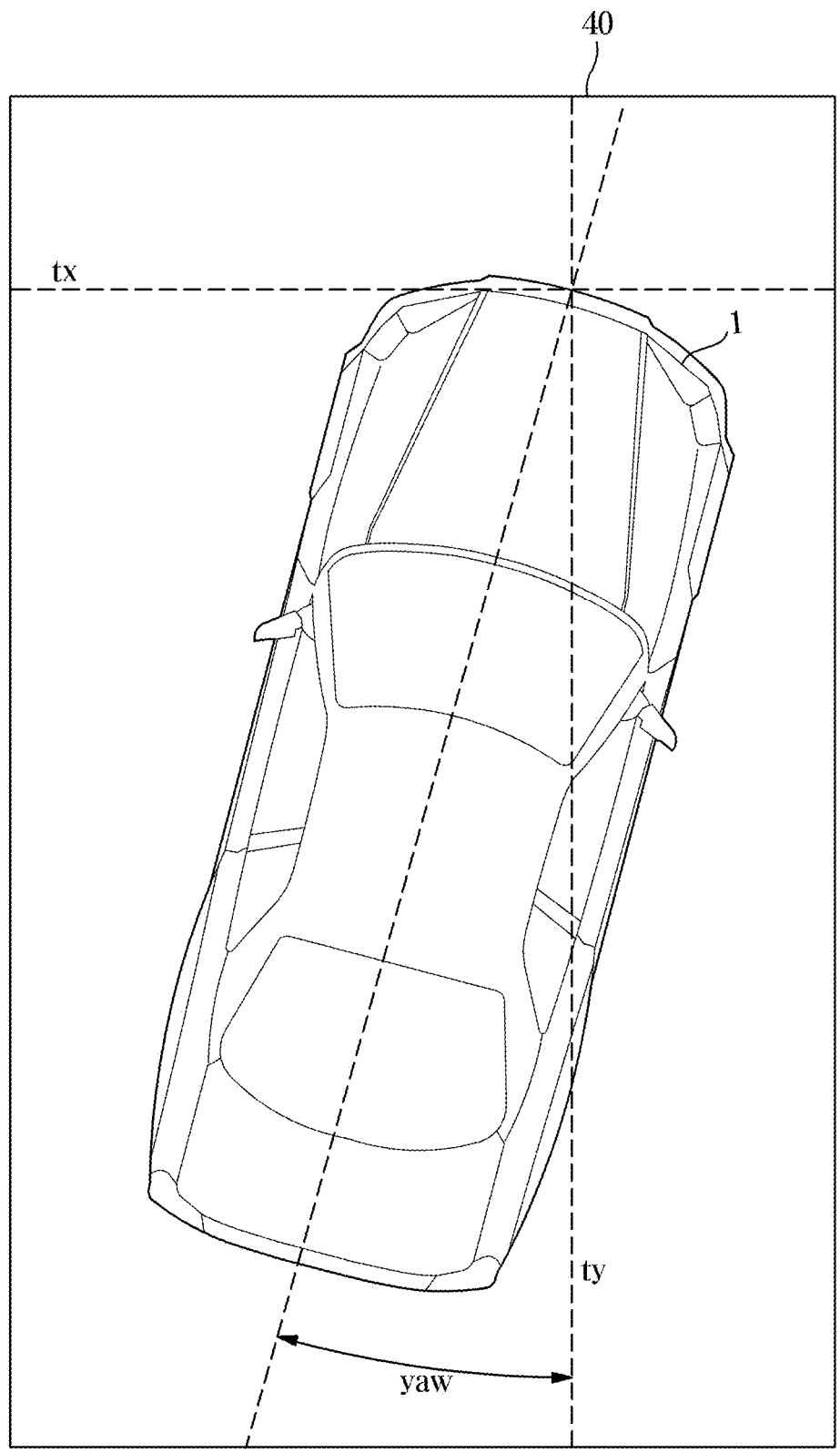
FIG. 12 is a diagram illustrating a result of estimating location information of a vehicle according to an embodiment.

Referring to FIG. 3B together with FIGS. 9 to 12, FIG. 9 is a diagram illustrating a perpendicular relationship among cameras provided in a vehicle according to an embodiment, FIG. 10 is a diagram illustrating a horizontal relationship among cameras provided in a vehicle according to an embodiment, FIG. 11 is a diagram illustrating position and direction information of a multi-camera provided in a vehicle according to an embodiment, and FIG. 12 is a diagram illustrating a result of estimating location information of a vehicle according to an embodiment.

In FIG. 3B, the controller 200 may include an x-axis and y-axis translation relationship estimator among perpendicularly positioned cameras 205 and may calibrate an x-axis translation amount and a y-axis translation amount of the first camera based on the first method and the second method.

Specifically, with respect to a geometric relationship between the first camera and the second camera, the controller 200 may compare the first method where the z-axis translation amount is not calibrated with the second method where the z-axis translation amount is calibrated.

Referring to FIG. 9, because a first camera 305 and a second camera 307 are in a perpendicular relationship, the x-axis translation amount of the first camera 305 is identical to y-axis translation amount of the second camera 307.

Because the z-axis translation amount is calibrated in the second method, the z-axis translation amount in the second method is a true value, and the z-axis translation amount in the first method is an error.

Accordingly, the controller 200 may determine, as an error of the first camera 305 in the x-axis direction, a difference between a location of the second camera 307 in the z-axis direction in the second method and a location of the second camera 307 in the z-axis direction in the first method, and may calibrate the x-axis translation amount of the first camera 305.

Likewise, the controller 200 may determine a difference between locations of a third camera (not shown) in the z-axis direction in the first method and the second method as an error of the first camera 305 in the y-axis direction and may calibrate the y-axis translation amount of the first camera 305.

After calibrating all the x-axis translation amount and the y-axis translation amount of the perpendicularly positioned cameras, as shown in FIG. 10, the controller 200 may calibrate an x-axis translation amount and a y-axis translation amount between horizontally positioned cameras 305 and 306 through a translation relationship estimator of global camera 206 (see FIG. 3B). As a result, the controller 200 may calibrate x-axes, y-axes, and z-axes of all the multi-camera, thereby calibrating an entire capture area.

Afterwards, the controller 200 may store information about locations and three axes of all the cameras included in the multi-camera in the memory 220, which is visualized as FIG. 11. That is, as shown in FIG. 11, the controller 200 may estimate a relationship between the wall 40 and a calibration marker by projecting the calibrated locations of the multi-camera 110, 120*a*, 120*b*, 130*a*, 130*b*, 130*c*, 130*d*, 140*a*, 140*b*, and 150 onto a floor surface which is a 2D plane through a vehicle location estimator 207 (see FIG. 3B).

Then, the controller 200 may fit camera projection points into a rectangle optimized for a shape of the vehicle 1 and may estimate a relationship between the vehicle 1 and the marker, thereby estimating the location of the vehicle 1.

Specifically, the controller 200 may visualize the relationship between the multi-camera and the calibration marker by using rotation and 3-axes translation values of the multi-camera 110, 120*a*, 120*b*, 130*a*, 130*b*, 130*c*, 130*d*, 140*a*, 140*b*, and 150. Then, when visualization information is projected to an x-y plane, the controller 200 may identify the locations and shooting directions of the cameras, as shown in FIG. 11. Afterwards, the controller 200 may model a rectangular object having a same ratio as the shape of the vehicle 1 with location and rotation values, may set a distance between the modeled rectangular object and the location of the camera as a residual, and may obtain a solution of maximum likelihood estimation that minimizes the residual. Then, the controller 200 may estimate a location and a rotation value of the rectangular object through the solution of maximum likelihood estimation and may measure a yaw value which is rotation of the vehicle 1 in a z-axis direction and a relative location of the vehicle 1 to the wall 40 of the calibration marker, as shown in FIG. 12.

As described above, the controller 200 may estimate the location of the vehicle 1 differently from an existing technology. Accordingly, costs for calibration equipment such as a vehicle alignment device, additional sensors, and image processing may be reduced.

FIG. 13 is a flowchart illustrating a control method of a vehicle according to an embodiment.

Referring to FIG. 13, the controller 200 may receive a first image, a second image, and a third image from a multi-camera (1300). The multi-camera may include a first camera, a second camera, and a third camera, and the first image, the second image, and the third image may include a calibration marker.

The controller 200 may detect the calibration marker from the first image, the second image, and the third image (1310). The calibration marker may be configured as a checker board for calibration that calibrates capture areas of the multi-camera.

Afterwards, the controller 200 may generate a reference camera to allow a shape of the calibration marker to be square (1320). The controller 200 may determine whether the shape of the calibration marker detected from the multi-camera is identical to a shape of a calibration marker of the reference camera (1330).

When the shape of the calibration marker detected from the multi-camera is different from the shape of the calibration marker of the reference camera (No in operation 1330), the controller 200 may determine a rotation value to allow the shape of the calibration marker detected from the multi-camera to be identical to the shape of the calibration marker of the reference camera (1340).

That is, the controller 200 may determine the rotation value so that the multi-camera and the reference camera whose optical axis is perpendicular to the calibration marker have the same optical axis and may calibrate the multi-camera with the rotation value (1350).

When the shape of the calibration marker detected from the multi-camera is identical to that of the calibration marker of the reference camera (Yes in operation 1330) or when the multi-camera is calibrated with the rotation value (1350), the controller 200 may determine a distance to the calibration marker to be inversely proportional to an area of the calibration marker based on perspective (1360).

The controller 200 may calibrate a movement value in a z-axis direction which is an optical axis direction (1370) based on the distance to the calibration marker from each of the first camera, the second camera, and the third camera included in the multi-camera.

FIG. 14 is a flowchart illustrating a control method of a vehicle according to an embodiment continued from FIG. 13.

Referring to FIG. 14, in a state where movement values in the z-axis direction of all the cameras of the multi-camera are calibrated, the controller 200 may derive a geometric relationship by detecting a same calibration marker from the first image of the first camera and the second image of the second camera (first method, 1400).

Then, the controller 200 may derive a geometric relationship by detecting different calibration markers from the first image and the second image (1410). Specifically, the controller 200 may derive the geometric relationship by calculating the different calibration markers in a coordinate system of the vehicle 1.

The controller 200 may calculate an error in a first direction of the second camera based on the geometric relationship between the first camera and the second camera and may determine the error in the first direction of the second camera as a movement value in a second direction of the first camera (1420). For example, an error in the z-axis direction of the second camera may be determined as a movement value in the x-axis direction of the first camera.

In the same way, the controller 200 may derive a geometric relationship by detecting a same calibration marker from the first image and the third image (not shown) and may derive the geometric relationship by detecting different calibration markers from the first image and the third image (1430).

Afterwards, the controller 200 may calculate an error in a first direction of the third camera based on the geometric relationship between the first camera and the third camera and may determine the error in the first direction of the third camera as a movement value in a third direction of the first camera (1440). For example, an error in the z-axis direction of the third camera may be determined as a movement value in the y-axis direction of the first camera.

Accordingly, the controller 200 may calibrate a capture area of the first camera (1450) and may also calibrate capture areas of all the cameras of the multi-camera in the same way. The controller 200 may estimate a location of the vehicle 1 based on the calibrated capture areas of the entire multi-camera (1460).

Thus, unlike an existing camera calibration method that manually inputs actually installed marker coordinate points corresponding to each camera, according to embodiments of the disclosure, multi-camera calibration is enabled without inputting marker coordinate points.

Also, the vehicle 1 according to an embodiment may find actually installed marker coordinate points using a relationship among perpendicularly positioned cameras, without checking the number of all cases to find the actually installed marker coordinate points.

In addition, the vehicle 1 according to an embodiment may use a relationship among cameras of the multi-camera, thereby automatically determining whether calibration is correctly performed and estimating a location of the vehicle 1 from locations of the cameras of the multi-camera without separately inputting the location of the vehicle 1.

Therefore, a calibration automation system where all of the cameras of the multi-camera are automatically calibrated when the vehicle 1 according to an embodiment arrives at calibration equipment may be enabled.

As is apparent from the above, according to the embodiments of the disclosure, a plurality of cameras provided in a vehicle can be automatically calibrated, thereby saving a time for manually calibrating the plurality of cameras.

Meanwhile, the disclosed embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable medium.

The computer-readable recording medium includes all kinds of recording media in which instructions which may be decoded by a computer are stored, for example, a read only memory (ROM), a random access memory (RAM), magnetic tapes, magnetic disks, flash memories, an optical recording medium, and the like.

Although embodiments have been described for illustrative purposes, those skilled in the art will appreciate that various modifications, additions, and substitutions are possible, without departing from the scope and spirit of the disclosure. Therefore, embodiments have not been described for limiting purposes.

What is claimed is:

1. A vehicle comprising:
   a multi-camera comprising a plurality of cameras, the plurality of cameras comprising a first camera, a second camera, and a third camera; and
   a controller configured to:
   receive a first image captured by the first camera, wherein the first image is captured in a first direction;
   receive a second image captured by the second camera, wherein the second image is captured in a second direction perpendicular to the first direction;
   receive a third image captured by the third camera, wherein the third image is captured in a third direction perpendicular to each of the first direction and the second direction;
   detect calibration markers from each of the first image, the second image, and the third image;
   calibrate a first movement value in an optical axis direction of each of the first camera, the second camera, and the third camera;
   calibrate a second movement value in the second direction of the first camera based on the calibrated first movement value in the optical axis direction of the second camera;
   calibrate a third movement value in the third direction of the first camera based on the calibrated first movement value in the optical axis direction of the third camera; and
   calibrate a capture area of the first camera.

2. The vehicle of claim 1, wherein the controller is configured to:
   generate a reference camera to allow a shape of a detected calibration marker to be square; and
   compare a shape of each of the calibration markers detected from each of the first image, the second image, and the third image with the shape of the calibration marker detected from the reference camera to calibrate the first movement values in the optical axis direction of the first camera, the second camera, and the third camera.

3. The vehicle of claim 2, wherein the controller is configured to:

determine a rotation value to allow the shape of each of the calibration markers detected from the first image, the second image, and the third image to be identical to the shape of the calibration marker detected from the reference camera; and calibrate the first movement values in the optical axis direction of the first camera, the second camera, and the third camera based on the rotation value.

4. The vehicle of claim 3, wherein the controller is configured to:

calibrate the calibration markers detected from the first image, the second image, and the third image based on the rotation value; and determine a distance to each of the calibration markers to be inversely proportional to an area of the calibration marker to calibrate the first movement values in the optical axis direction of the first camera, the second camera, and the third camera.

5. The vehicle of claim 1, wherein the controller is configured to calculate an error in the first direction based on a geometric relationship between the first camera and the second camera derived by detecting a same calibration marker from the first image and the second image and the geometric relationship derived by converting different calibration markers from the first image and the second image into a coordinate system of the vehicle.

6. The vehicle of claim 5, wherein the controller is configured to calibrate the capture area of the first camera by determining the error in the first direction as the second movement value in the second direction of the first camera.

7. The vehicle of claim 1, wherein the controller is configured to calculate an error in the first direction based on a geometric relationship between the first camera and the third camera derived by detecting a same calibration marker from the first image and the third image and the geometric relationship derived by converting different calibration markers from the first image and the third image into a coordinate system of the vehicle.

8. The vehicle of claim 7, wherein the controller is configured to calibrate the capture area of the first camera by determining the error in the first direction as the third movement value in the third direction of the first camera.

9. The vehicle of claim 1, wherein the controller is configured to estimate a location of the vehicle by calibrating capture areas of the second camera and the third camera based on the calibrated capture area of the first camera.

10. The vehicle of claim 9, wherein the controller is configured to:

determine a location of the multi-camera based on the calibrated capture areas of the first camera, the second camera, and the third camera mounted on the vehicle; and estimate the location of the vehicle based on the location of the multi-camera.

11. A control method of a vehicle, the control method comprising:

receiving a first image captured by a first camera mounted on the vehicle, wherein the first image is captured in a first direction, the first direction being an optical axis direction of the first camera;

receiving a second image captured by a second camera mounted on the vehicle, wherein the second image is captured in a second direction perpendicular to the first direction, the second direction being an optical axis direction of the second camera;

receiving a third image captured by a third camera mounted on the vehicle, wherein the third image is captured in a third direction perpendicular to each of the first direction and the second direction, the third direction being an optical axis direction of the third camera;

detecting calibration markers from the first image, the second image, and the third image;

calibrating a first movement value in the optical axis direction of each of the first camera, the second camera, and the third camera;

calibrating a second movement value in the second direction of the first camera based on the calibrated first movement value in the optical axis direction of the second camera; and calibrating a third movement value in the third direction of the first camera based on the calibrated first movement value in the optical axis direction of the third camera; and calibrating a capture area of the first camera.

12. The control method of claim 11, wherein calibrating the first movement value in the optical axis direction comprises:

generating a reference camera to allow a shape of a detected calibration marker to be square; and comparing a shape of the calibration markers detected from each of the first image, the second image, and the third image with the shape of the calibration marker detected from the reference camera to calibrate the first movement values in the optical axis direction of each of the first camera, the second camera, and the third camera.

13. The control method of claim 12, wherein calibrating the first movement value in the optical axis direction comprises:

determining a rotation value to allow the shape of each of the calibration markers detected from the first image, the second image, and the third image to be identical to the shape of the calibration marker detected from the reference camera; and calibrating the first movement values in the optical axis direction of the first camera, the second camera and the third camera based on the rotation value.

14. The control method of claim 13, wherein calibrating the first movement value in the optical axis direction comprises:

calibrating the first camera, the second camera, and the third camera based on the rotation value; and determining a distance to the calibration marker to be inversely proportional to an area of the calibration marker to calibrate the first movement values in the optical axis direction of the first camera, the second camera, and the third camera.

15. The control method of claim 11, wherein calibrating the capture area of the first camera comprises calculating an error in the first direction based on a geometric relationship between the first camera and the second camera derived by detecting a same calibration marker from the first image and the second image and the geometric relationship derived by converting different calibration markers from the first image and the second image into a coordinate system of the vehicle.

16. The control method of claim 15, wherein calibrating the capture area of the first camera comprises determining the error in the first direction as the second movement value in the second direction of the first camera.

17. The control method of claim 11, wherein calibrating the capture area of the first camera comprises calculating an error in the first direction based on a geometric relationship between the first camera and the third camera derived by detecting a same calibration marker from the first image and the third image and the geometric relationship derived by converting different calibration markers from the first image and the third image into a coordinate system of the vehicle.

18. The control method of claim 17, wherein calibrating the capture area of the first camera comprises determining the error in the first direction as the third movement value in the third direction of the first camera.

19. The control method of claim 11, further comprising estimating a location of the vehicle by calibrating capture areas of the second camera and the third camera based on the calibrated capture area of the first camera.

20. The control method of claim 19, wherein estimating the location of the vehicle further comprises:
   determining a location of each of the first camera, the second camera, and the third camera based on the calibrated capture areas of the first camera, the second camera, and the third camera; and
   estimating the location of the vehicle based on the location of each of the first camera, the second camera, and the third camera.

* * * * *